Oct. 6, 1970  ORIYUKI AMINO ET AL  3,531,969
METHOD AND APPARATUS FOR REPLACING WORK ROLL CHOCKS
Filed June 5, 1967  14 Sheets-Sheet 8

United States Patent Office 3,531,969
Patented Oct. 6, 1970

3,531,969
METHOD AND APPARATUS FOR REPLACING WORK ROLL CHOCKS
Oriyuki Amino, Kiyoto Fujita, and Kiyoji Nakanishi, Yamaguchi, and Motoi Yasue and Tadao Kumagai, Aichi, Japan, assignors to Nippon Steel Corporation, Tokyo, Japan, and Ube Kosan Kabushiki Kaisha, Yamaguchi-ken, Japan
Filed June 5, 1967, Ser. No. 643,677
Claims priority, application Japan, June 7, 1966, 41/36,270
Int. Cl. B21b *31/10*
U.S. Cl. 72—239
9 Claims

ABSTRACT OF THE DISCLOSURE

Apparatus for removing supporting chocks from the rolls of a rolling mill, to provide for transport of the rolls to a refinishing or regrinding shop, comprises a pair of movable roll support columns each carrying roll supporting rollers engageable with the working rolls. The apparatus further comprises working roll receiving supports having tapered means on the working roll support surfaces for adjusting the lateral position of the working rolls positioned between the roll support columns. Movable support blocks carry mechanisms for mounting and dismounting retaining means on the ends of the working rolls. The various components are operated by fluid pressure actuators, such as hydraulic cylinder and piston actuators, and are movable upon respective slides or the like.

BACKGROUND OF THE INVENTION

The rectification of the cylindrical surfaces or the like of working rolls of a rolling mill, hereinafter referred to as rolls, by grinding is carried out comparatively frequently. Each time, the supporting chocks must be disengaged from the roll and, when the roll has been refinished, the supporting chocks must be re-engaged with the rolls. This work, to date, has been carried out manually using a crane, and this involves the following difficulties.

(1) A pair of the upper and the lower roll chocks must be taken out of the roll stand, carried by the crane, and placed on separate blocks to be handled separately. For this, not only a lot of manpower and time but also a large floor space are necessary.

(2) During the work, large or heavy parts must all be handled by the crane, so that the crane cannot be utilized for other purposes, which results in lowering the factory efficiency.

(3) The work itself needs a very high skill.

(4) All the objects to be handled are extremely dirty with grease, mill scales etc., so that nobody likes this work, which also results in lowering the factory efficiency.

(5) Under such circumstances, the work itself is naturally accompanied with considerable danger.

SUMMARY OF THE INVENTION

In order to solve the above mentioned difficulties, the present invention is directed to apparatus with which a pair of upper and lower roll chocks can simultaneously be handled, whereby a series of handlings are mechanically carried out by hydraulic means in such a manner that the worker need not directly touch the object to be handled so often and even the unskilled worker can finish the handling within a comparatively short time.

BRIEF DESCRIPTION OF THE DRAWINGS

The invention will be better understood from the following description taken in connection with the accompanying drawings in which.

Figure 1:
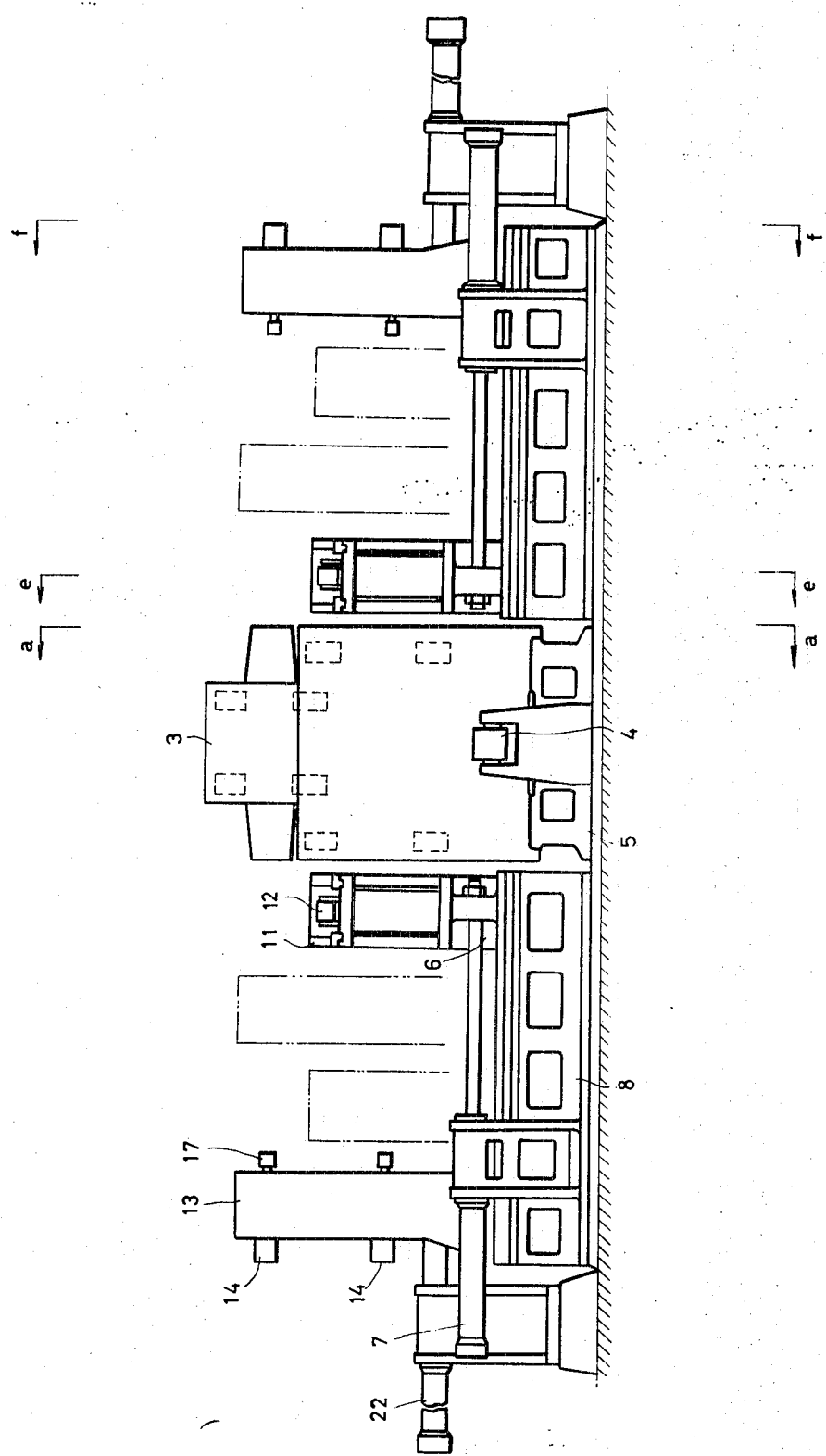
FIG. 1 is an elevation view of an embodiment of the equipment for rearranging the work roll chocks of a rolling mill according to the invention, FIG. 2 a view along the line *a—a* of FIG. 1, FIG. 3 a view along the line *b—b* of FIG. 2, FIG. 4 an enlarged section along the line *c—c* of FIG. 3, FIG. 5 a section along the line *d—d* of FIG. 4, FIG. a section along the line *e—e* of FIG. 1, FIG. 7 a view along the line *f—f* of FIG. 1, FIG. 8 an enlarged section along the line *g—g* of FIG. 7.
Figure 2:
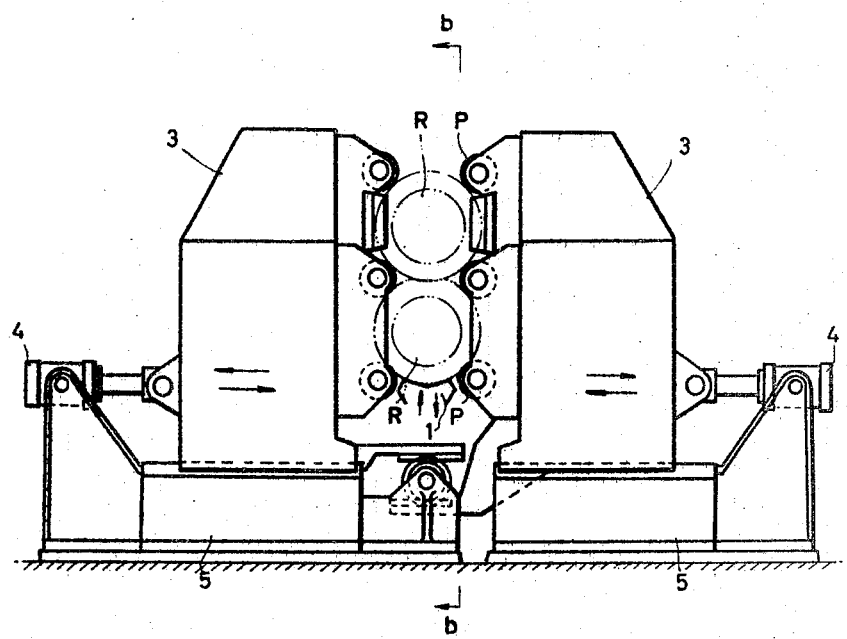
Figure 3:
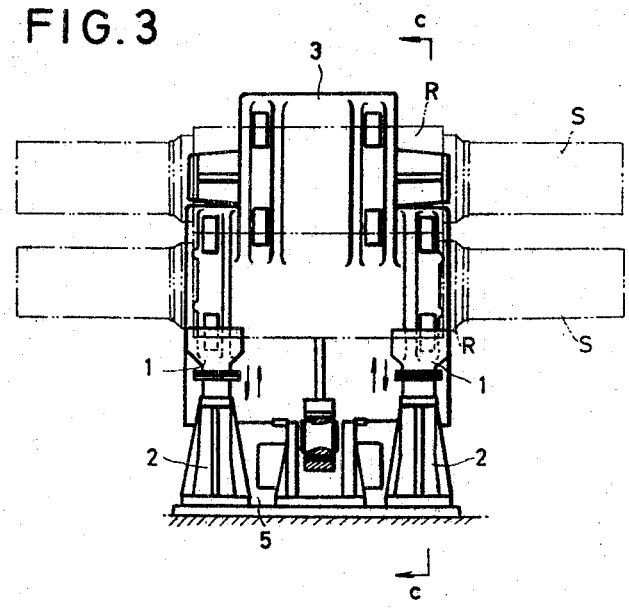
Figure 4:
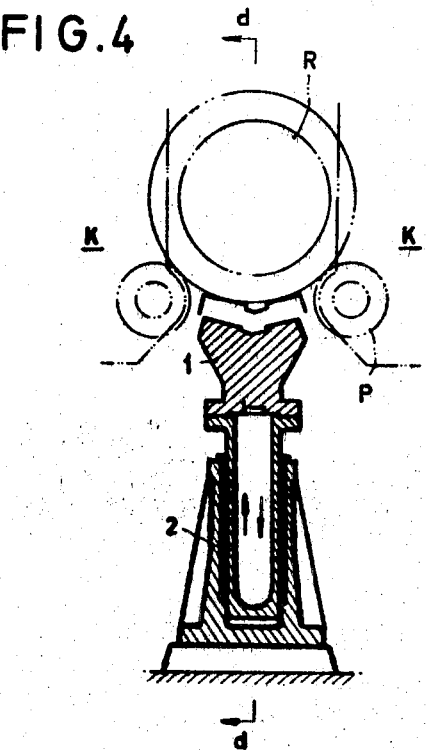
Figure 5:
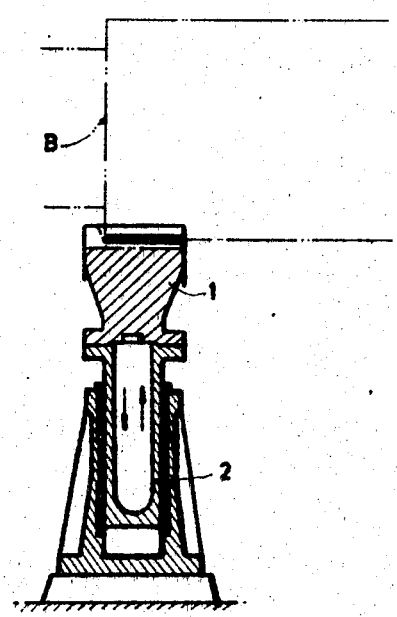
Figure 6:
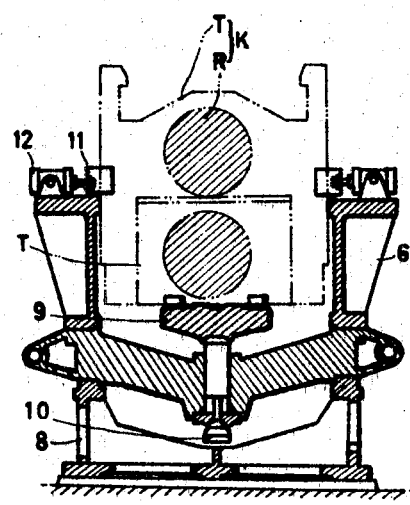
Figure 7:
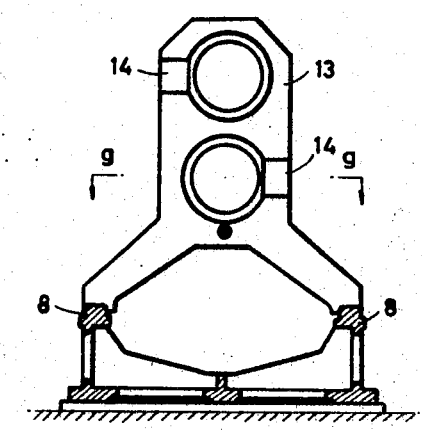

In the drawings, the roll chock assemblies of a rolling mill, which latter has not been shown in the drawings, are indicated at and the chocks are indicated at T.

The chocks T are divided into upper and lower chocks, whereby the upper chock is provided on the upper work roll R, and the lower check T on the lower work roll R.

In this embodiment of the invention, the working rolls are arranged to be supported on roll receiving blocks 1 whose upper surfaces are V-shaped to properly set the lateral position of a roll barrel B supported thereon. Each of these blocks is operatably associated with a hydraulic cylinder 2 which lifts and lowers the associated roll receiving block 1. Each hydraulic cylinder is always under a properly determined hydraulic pressure, so that it serves as a shock absorber when a roll R is positioned on the blocks 1.

Roll support columns 3, each of which carries a number of support rollers *p*, are movable simultaneously on column slides 5 in a manner explained hereinafter. The columns 3 are moved by hydraulic cylinders 4. Chock extracting blocks 6 are moved by hydraulic cylinders 7 along slides 8. Chock supporting blocks 9 are lifted and lowered by hydraulic cylinders 10 and carry chock receivers 11 which are projected and retracted by hydraulic cylinders 12.

Figure 8:
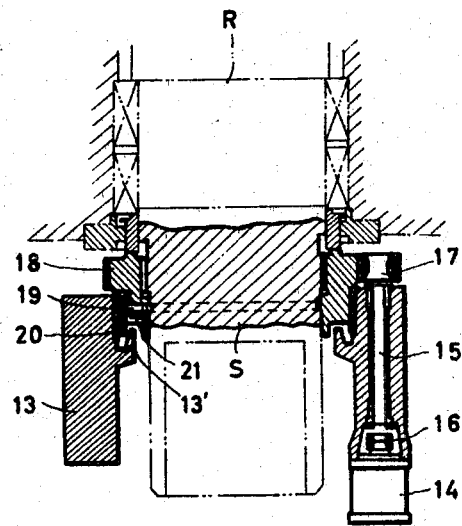
Figure 9:
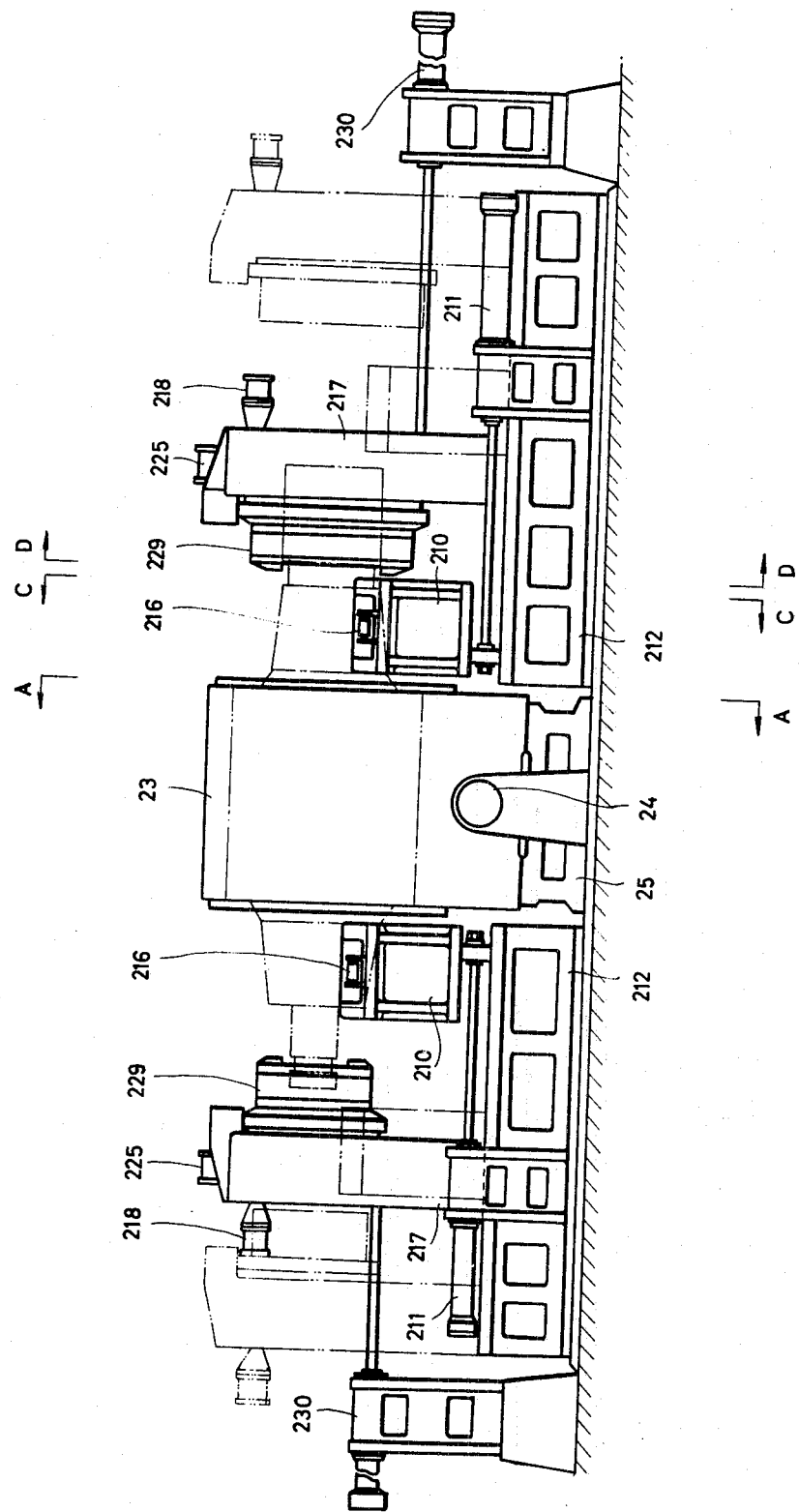
FIG. 9 is an elevation view of another embodiment of the equipment for rearranging the roll chocks of a rolling mill according to the invention, FIG. 10 a sectional view along the line A—A of FIG. 9, FIG. 11 a sectional view along the line B—B of FIG. 10, FIG. 12 a sectional view along the line C—C of FIG. 9, FIG. 13 a sectional view along the line D—D of FIG. 9, FIG. 14 a sectional view along the line E—E of FIG. 10, FIG. 15 a sectional view along the line F—F of FIG. 13, FIG. 16 a view along the line G—G of FIG. 15, FIG. 17 a sectional view along the line H—H of FIG. 15.
Figure 10:
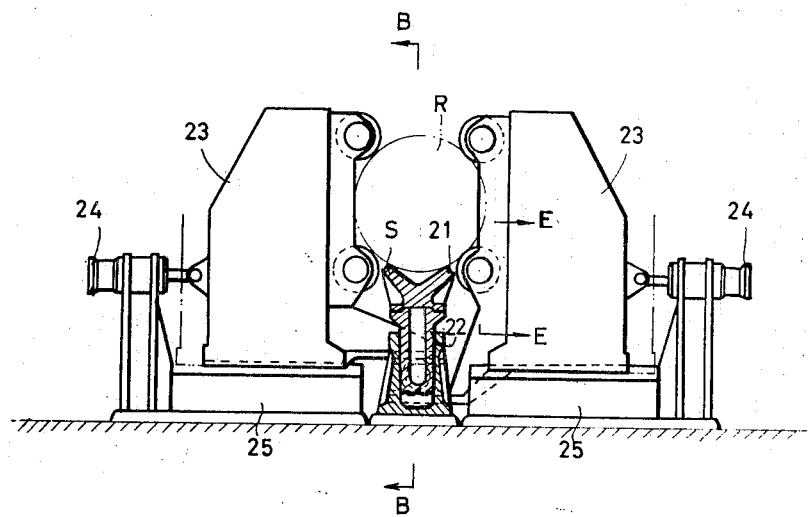
Figure 11:
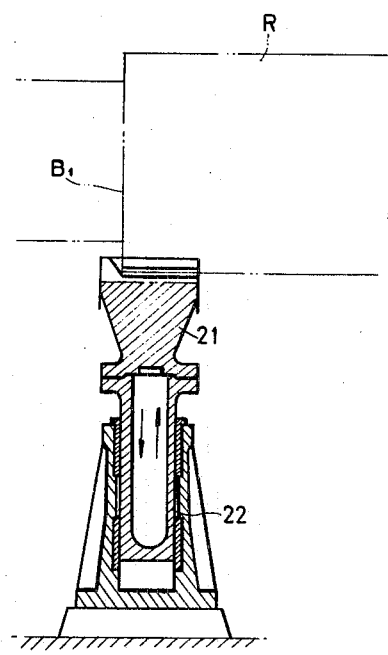
Figure 12:
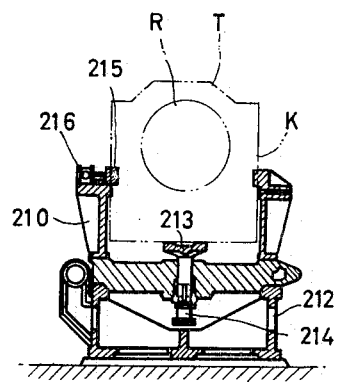
Figure 13:
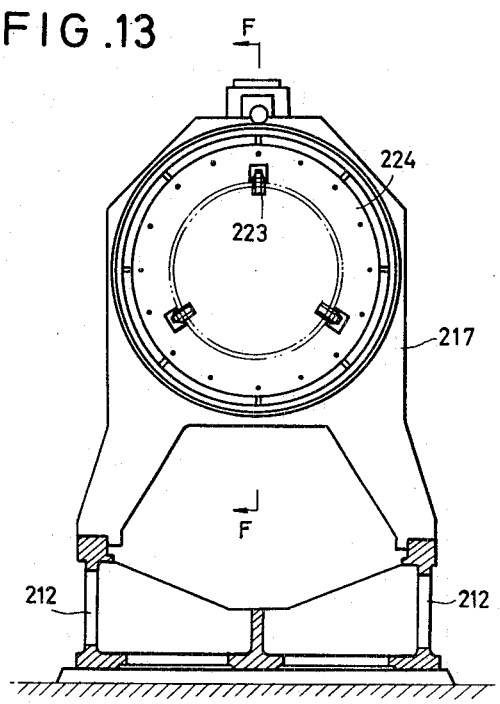
Figure 14:
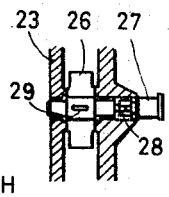
Figure 15:
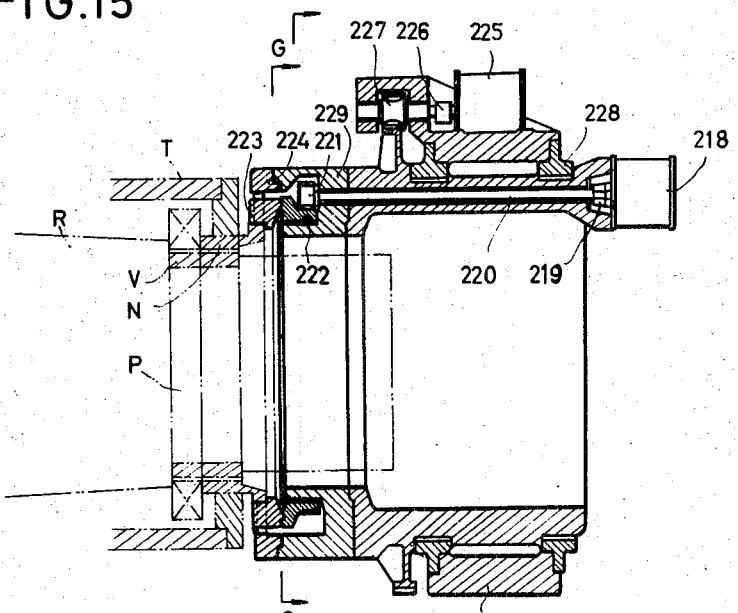
Figure 16:
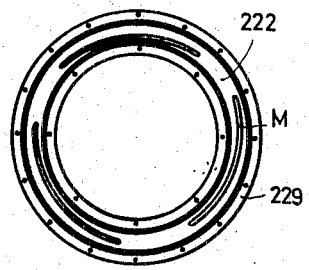
Figure 17:
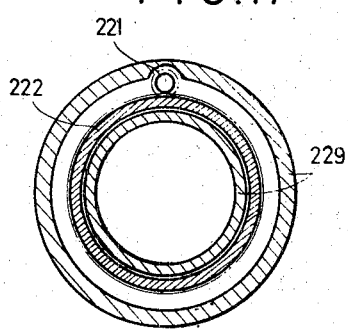

Bearing nut mounting and dismounting blocks 13 are formed with channels 13' and are operatively associated with hydraulic motors 14, which have an adjustable torque. Couplings 16 connect motors 14 to shafts 15 to which are fixed pinions 17, as best seen in FIG. 8. The bearing nuts are indicated at 18, and each bearing nut has a ring gear formed on its external circumference and this ring gear meshes with a pinion 17. The internal periphery of each nut 18 is threaded to mesh with a male thread of a roll neck S. A pin 19 is positioned at a location on each bearing nut 18 and may be pushed into a groove on the surface of a roll neck S while the bearing nut is being threaded on to the neck. A lever 20 is connected with each knocking pin 19, through the medium of a pivot, and serves to continually bias the associated pin 19 toward the surface of the associated roll neck S under the influence of a spring 21. The bearing nut mounting and dismounting blocks 13 are moved by hydraulic cylinders 22.

The bearing nut mounting and dismounting mechanism consists mainly of the hydraulic motor 14, the pinion shaft 15, the coupling 16, the pinion 17, and the bearing nut 18.

The operation of the embodiment according to the present invention will be explained below.

(I) How the chocks are removed from the work roll chocks.

The working roll chocks, including both the upper and lower chocks, which have been removed as a unit from the roll stand of the rolling mill, are carried by means of the overhead crane, which is not shown in the drawings, and laid on the roll receiving blocks 1. The hydraulic cylinders 2 are always lifted with a constant lifting power and, when loaded with the upper and lower chocks as a whole, the blocks 1 are lowered to the full stroke of the cylinders 2 due to the weight of the chocks so that the shock when the roll chocks are laid thereupon is absorbed.

At both ends of the roll barrels, the receiving blocks have supporting surfaces which are V-shaped to receive and properly laterally position the roll barrels B. Thereby, the respective working rolls R are properly positioned between the roll support columns 3.

The roll support columns 3 are connected with hydraulic cylinders 4, which, when operated, make both columns 3—3 approach each other simultaneously sliding upon the sliding blocks 5 in such a manner that they simultaneously embrace both upper and lower rolls R—R so that the heights of the centers of both upper and lower rolls R—R are automatically determined.

The chock extracting blocks 6 are connected with the hydraulic cylinders 7 for sliding the chock extracting block, which cylinders, when supplied wtih pressure oil, slide the chock extracting blocks 6 on the sliding blocks 8 until the chock extracting blocks 6 reach the position T. In this case, the chock supporting blocks 9 and the chock receiver 11 are placed in a pulled-in state by means of the hydraulic cylinders 10 and 12 connected therewith.

The chock supporting blocks 9 are lifted by means of the hydraulic cylinders 10 to support the lower surfaces of the lower chocks T. (In this case the lifting power of the hydraulic cylinders is to be hydraulically so predetermined by means of a pressure adjusting valve as to be a little greater than the weight of the roll chocks K.) Then, the chock receivers 11 are pushed forwards by means of the hydraulic cylinders 12 to press both ends of the upper chocks T.

Next, the bearing nut mounting and dismounting blocks 13 are moved by the hydraulic cylinders 22 on the sliding blocks 8 until they reach the predetermined position where the bearing nuts 18 mesh with pinions 17.

When the bearing nut mounting and dismounting blocks 13 have reached the predetermined position, by supplying the hydraulic motors 14 attached to the bearing nut mounting and dismounting blocks 13 with oil pressure the bearing nuts 18 are turned by means of pinions 17 through couplings 16 and shafts 15, so that nuts 18 are screwed off the male threads on the roll necks S. By this operation, the knocking pins 19 are withdrawn as the levers 20 are disengaged from channels 13', so that nuts 18 are ready to be turned.

Each bearing nut 18 is pulled out in a state embraced in the bearing nut mounting and dismounting block 13, because the hydraulic circuit is constructed in such a manner that the rate of axial movement of a nut 18 and the rate of movement of the associated block 13 are nearly synchronous until the nut is completely threaded off the male thread on the roll neck S. After each bearing nut 18 has been completely screwed off the male thread on the roll neck S, the supply of pressure oil to the hydraulic cylinder 22 is increased, so that the bearing nut mounting and dismounting block 18 withdraws with increased speed to a position spaced from an end of the roll shaft, where it stops. Then, the hydraulic cylinder 7 for sliding the chock extracting block is supplied with pressure oil, so that the chock extracting block 6 is moved and the chocks are extracted.

The upper and lower rolls R are suspended, while supported by roll support columns 3, by means of the overhead crane. Then the columns are retracted and the rolls are carried to the refinishing factory by the crane.

(II) How the chocks are mounted on the work roll

The lower roll R which has been refinished is carried by the overhead crane and placed on the roll receiving blocks 1. In this case, the relative lateral position between the rolls R and the roll receiving blocks 1 is adjusted.

The upper role R which has been refinished is carried by the overhead crane, and suspended above the lower roll R which has already been positioned, whereby their relative right and left positions are adjusted. Then, the roll support columns 3 are moved forward by means of the hydraulic cylinders 4, and embrace both upper and lower rolls R—R. (Just the same as the case with the aforementioned dismounting operation, the heights of both upper and lower rolls R—R are automatically determined herewith.)

The suspending means for the upper roll is then removed, and the remaining operations are carried out in an order reversed substantially with respect to the dismounting operations.

Another embodiment of the present invention will be described with reference to FIGS. 9 through 17.

In this embodiment, the roll chock assemblies are again designated by K and the rolls by R. The roll necks are indicated at P, whereas the chocks are indicated by T and the lock nuts by N. By screwing the lock nuts N onto the threaded half rings V, attached to the necks P of each roll, the chocks T are secured tightly on the necks.

In the same manner as the roll receiving blocks 1 of the embodiment previously described, roll receiving blocks 21 have V-shaped roll receiving surfaces, including wings S for engaging the roll barrels B to adjust the lateral positions of the rolls R. The roll receiving blocks are lifted and lowered by respective hydraulic cylinders 22 which are always under a properly determined pressure to serve as shock absorbers when rolls are placed on the roll receiving blocks.

The roll support colums 23 again carry a plurality of support rollers 26, and are movable simultaneously on slides 25, as will be explained hereinafter. The movement is effected by hydraulic cylinders 24, or by hydraulic motors, and supporting rolls 26 are mounted on shafts 29 connected by couplings 28 to hydraulic motors 27. Chock extracting blocks 210 are moved by hydraulic cylinders 211, and chock support blocks 213 are raised and lowered by hydraulic cylinders 214.

Chock receivers 215 are operated by hydraulic cylinders 216. The lock nut mounting and dismounting blocks 217 carry hydraulic motors 218, which have an adjustable torque. Each of these motors drives a shaft 220 through the medium of a coupling 219 and each shaft carries a pinion 221 engaged with a ring gear 222 meshing therewith. One lateral surface of each ring gear is formed with three spiral grooves M at equal angular intervals, and the inner periphery of each ring gear is formed for sliding movement.

Each spiral groove M receives a claw 223, and a cover 224 is associated with each ring gear. Another hydraulic motor 225 is connected by a coupling 226 to a shaft pinion 27 operatably meshing with an external ring gear on a drum 229 mounted on a drum receiving 228. This drum also carries motor 218, coupling 219, pinion 221, ring gear 222 and claws 223. The lock-nut mounting and dismounting blocks 217 are operated by hydraulic cylinders 230.

The operation of the above mentioned embodiment will be explained below.

(I) How the chocks T are removed from the roll chocks K.

The roll chocks K, which have been removed from the roll stand of the rolling mill which is not shown in the drawings, are carried by the overhead crane which is not shown in the drawings, and laid on the roll receiving block 21.

The hydraulic cylinder 22 is always lifted with a constant lifting power, and, when loaded with the roll chocks K, the roll receiving block 21 is lowered to the full stroke 22 so that the shock, when the roll chocks are laid thereupon, is absorbed.

Due to the V-shape of the receiving surfaces of the roll receiving blocks, diverging fingers or claws S are provided which center or adjust the roll R relative to the roll support columns 23.

The roll support columns 23 are connected with the hydraulic cylinders 24, which, when operated, make columns 23—23 approach each other simultaneously sliding upon the sliding blocks 25 for the columns in such a manner that they simultaneously embrace the rolls R, so that the height of the centers of the rolls R is automatically determined.

When the hydraulic motor 27 is then supplied with pressure oil, it turns the support rolls 26 through the coupling 28 and the shaft 29 of the support roll, whereby the rolls R are turned to the predetermined position.

The chock extracting blocks 210 are connected with the hydraulic cylinders 211 for sliding the chock extracting blocks, which cylinders, once supplied with pressure, slide blocks 212 to the position of the chocks T. In this case, the chock support 213 and the chock receiver 215 are withdrawn by the respective hydraulic cylinders 214 and 216.

Then, the chock supporting block 213 is lifted by the hydraulic cylinder 214 to support the lower surface of the chock T. (In this case the lifting power of the hydraulic cylinder 214 is hydraulically so predetermined, by means of a pressure adjusting valve, as to be a little greater than the weight of the roll chock T.) Next, the chock receiver 215 is moved inwardly by the hydraulic cylinder 216 so as to press both sides of the chocks T.

The nut mounting and dismounting block 217 then is moved on the sliding block 212 by the hydraulic cylinder 230 until it reaches the predetermined position i.e. the position of the lock nut N.

When the lock nut mounting and dismounting block 217 reaches the predetermined position, by supplying the hydraulic motor 218 attached to the drum 229 with pressure oil, the ring gear 222 is turned with the pinion 221 through the coupling 219 and the pinion shaft 220. As ring gear 222 is turned, the claws 223 which are fitted in the spiral grooves M on the side surface of the ring gear 222 approach each other along the guide grooves of the cover 224 until they catch the lock nut N.

By supplying the hydraulic motor 225, mounted on the lock nut mounting and dismounting block, with pressure oil, the drum 229 is turned by pinion 227 through coupling 226 while maintained in the drum receiver 228. Thereby, lock nut N is unthreaded from the male thread on the threaded half ring V mounted on the neck P of the roll R. The hydraulic circuits are designed in a manner such that the speed of axial movement of lock nut N and the speed of axial movement of block 217 are nearly identical until the lock nut has been completely turned off the neck P. After the lock nut N has been completely removed from the neck of the roll, the supply of pressure oil to hydraulic cylinder 230 is increased so that block 217 withdraws with increased speed to a position spaced from an end of the neck of the roll, where it stops.

The hydraulic cylinders 211 now are supplied with pressure oil, so that chock extracting blocks 210 are moved and the chocks T are extracted. Roll R is suspended, while it is supported by the roll support columns, by means of the overhead crane. The columns 23 then are retracted, and the roll is carried to the refinishing factory by the overhead crane.

(II) How the chocks T are mounted on the rolls R

The roll R which has been refinished is carried by the overhead crane and placed on the roll receiving blocks 21. In this case, the suspending devices are removed after the roll position on the blocks 21 has been adjusted. The support columns 23 now are advanced by cylinders 24 until the roll R is engaged. In the same way as with the aforementioned dismounting operation, the heights of the rolls R are automatically determined herewith. Then, the support roll 26 is turned by the hydraulic cylinder 27, and thus the roll R is also turned so that it reaches the determined position.

Then operations following this are the reverse of the dismounting operations.

FIGS. 18 through 30 illustrate another embodiment of the invention in which the roll chocks are again designated K, the work rolls are indicated at R and the chocks are indicated at T.

The chocks are divided in two chocks, i.e. the upper chocks $T_1$ and the lower chocks $T_2$, whereby the upper work roll $R_1$ is mounted in the upper chocks $T_1$ and the lower work roll $R_2$ in the lower chocks $T_2$.

Figure 20:
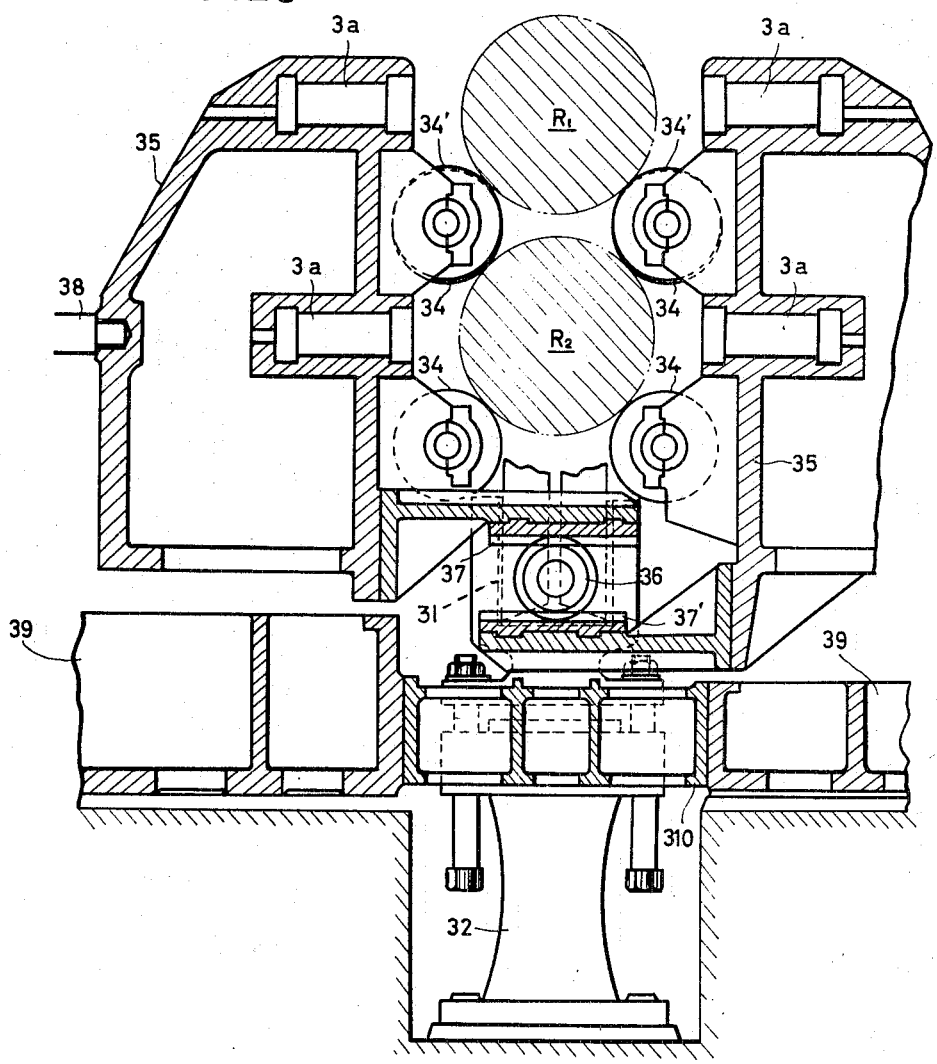

In FIG. 20, two sets of taper rollers are indicated at 31. When the lower work roll $R_2$ is placed on the tapered parts of the tapered rollers 31, the forward and backward deflection of the lower work roll $R_2$ is automatically corrected, and the center line of the lower work roll $R_2$ is brought in line with the lengthwise center line of the present equipment.

Figure 18:
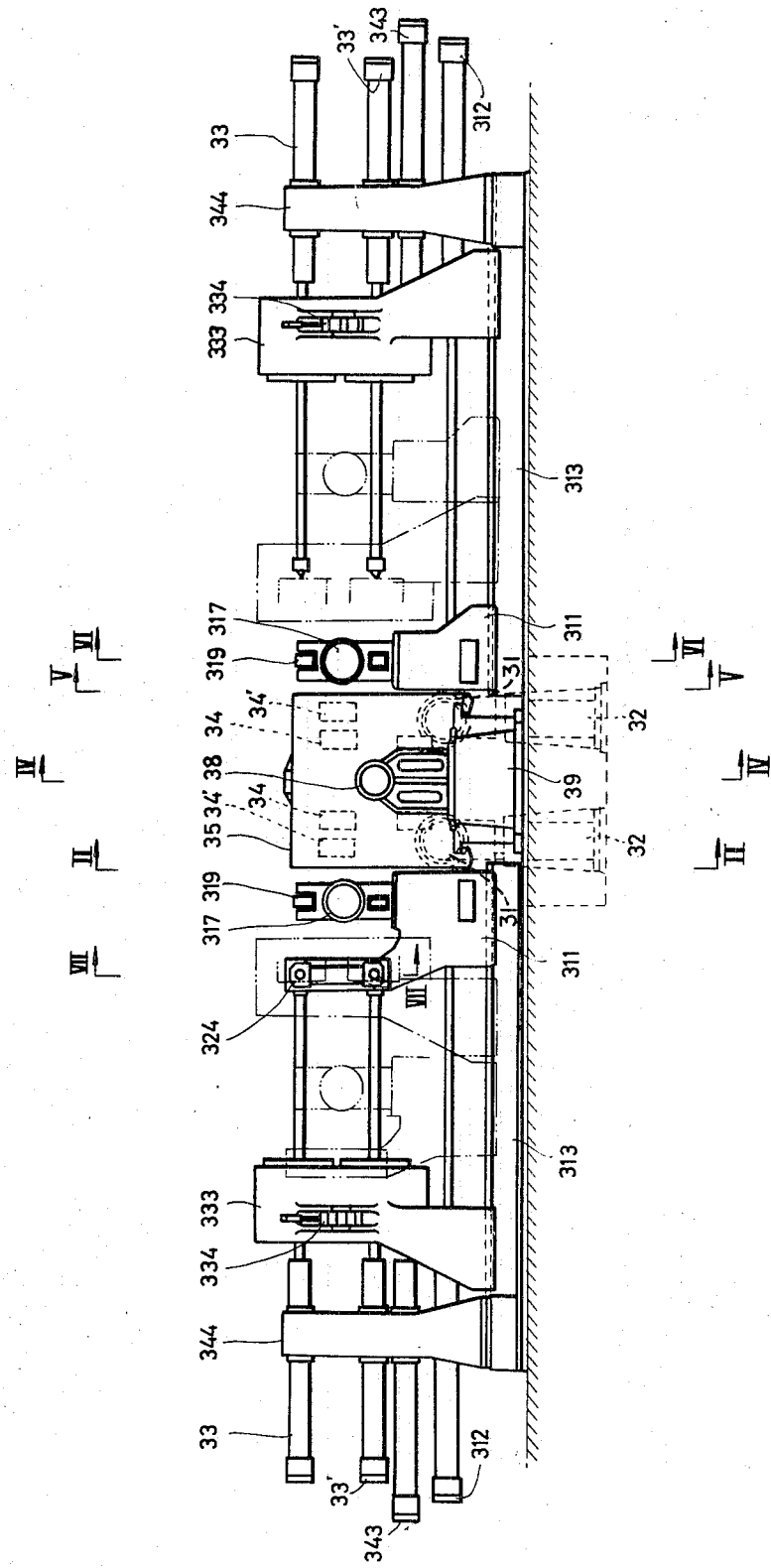
FIG. 18 is a elevation view of a further embodiment of the equipment for rearranging the work roll chocks of a rolling mill according to the invention, FIG. 19*a* section along the line II—II of FIG. 18, FIG. 20*a* section along the line IV—IV of FIG. 18, FIG. 21 an enlargement of a part in FIG. 20, the left half of FIG. 22 the view along the line V—V of FIG. 18, the right half of FIG. 22 the section along the line VI—VI of FIG. 18, FIG. 23 the section along the line VII—VII of FIG. 18, FIG. 24 an elevation view of a set collar mounting blocks of FIG. 18, FIG. 25 the section along the line VIII—VIII of FIG. 22, FIG. 26 the section along the line XI—XI of FIG. 24, FIG. 27 the section along the line X—X of FIG. 26, FIG. 28 the section along the line XI—XI of FIG. 27, FIG. 29 the section along the line XII—XII of FIG. 27, FIG. 30 the section along the line XIII—XIII of FIG. 27.
Figure 27:
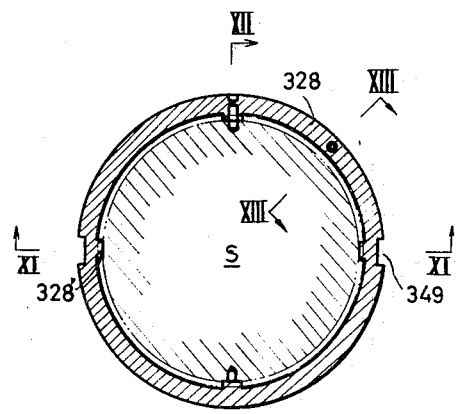
Figure 28:
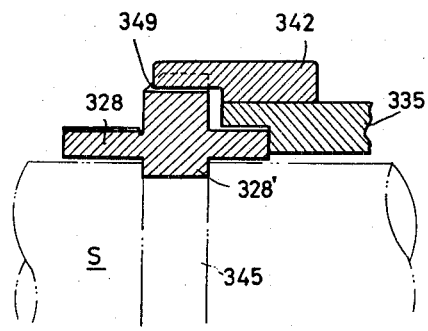

In FIG. 18 and FIG. 27, 32 is the roll receiving block, and hydraulic cylinders 33 and 33′ determine the lengthwise position of the work rolls R.

Roll support columns 35 are provided with support rollers 34 34′, and carry projecting racks 37 and 37′ which mesh with a pinion 36. The roll support columns are slid on blocks 39 by hydraulic cylinders 38. Pinion 36 is mounted in a block 310. Chock extracting blocks 311 are moved along slides 313 by hydraulic cylinders 312 and slides 313 also support the set collar mounting and dismounting block 333.

Figure 22:
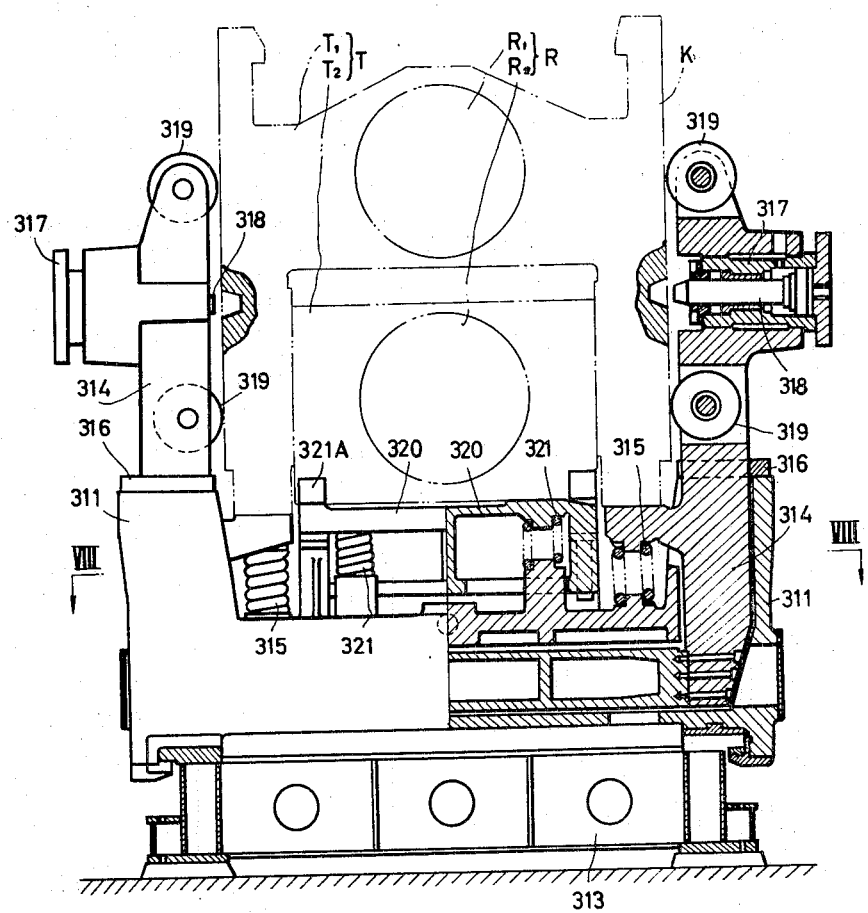

Referring to FIG. 22, upper chock receiving blocks 314, which receive only the upper chocks $T_1$, are mounted for vertical displacement in suitable guides of chock extracting blocks 311. Springs 315 support the upper chock receiving blocks and stops 316 prevent the upper chock receiving blocks from floating. Hydraulic cylinders 317, mounted in the upper chock receiving blocks operate taper pins 318 insertable into apertures on both sides of the chocks, to fix the upper chocks, and guide rollers 319 guide the chocks K.

Lower chock receiving blocks 320 receive only the lower chocks $T_2$, and are fitted in guides in blocks 311 for vertical displacement. Springs 321 support the lower receiving blocks 320, and stops 321A prevent blocks 320 from floating.

Figure 23:
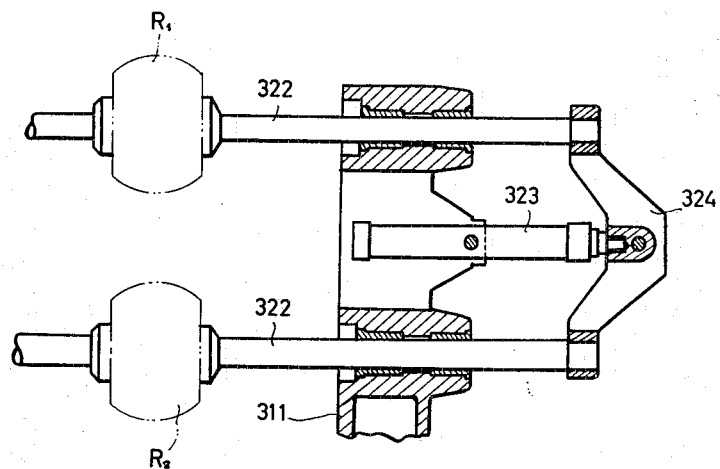

Referring to FIG. 23, groove matching push bars 322 are provided for the work rolls R, and are operated by a hydraulic cylinder 323 connected to a tie plate 324 interconnecting bars 322.

The mechanism for determining the position of the roll grooves comprises mainly the groove matching push bars 322 the hydraulic cylinder 323, and the tie plate. One of these mechanisms is mounted on each of the two chock extracting blocks 311.

In FIG. 26 to FIG. 29, the pin extracting claw 337 and the set collar claw 342, which are provided on the set collar mounting and dismounting block 333, must be brought in line with the grooves on the set collar 328 as follows, in order for the set collar 328 to be dismounted from the roll R and mounted on the roll R. Additionally the roll inserting claws 328′ which are situated on the internal surface of the set collar 328, must be brought in line with the roll grooves 345, on the outer circumferences of the rolls, when collar 328 is turned by about 20°, and assume the extractable position. Consequently, the angular position of the upper and lower rolls $R_1$ and $R_2$ must always be at a certain predetermined position. The mechanisms for determining the position of the roll grooves are intended to adjust the upper and lower rolls $R_1$ and $R_2$ to the determined position.

Figure 19:
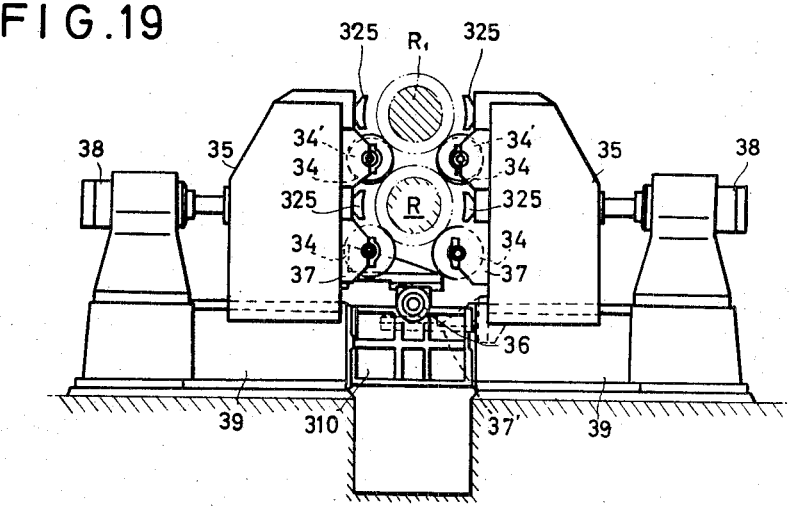
Figure 21:
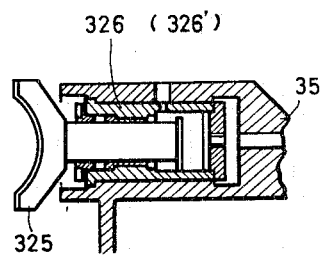

In FIGS. 19 and 21, 325 are the roll clamps which are provided at the center of the columns 35 and intended to prevent the rolls $R_1$—$R_2$ from turning, and 326 and 326′ are the hydraulic cylinders which operate the roll clamps.

Figure 26:
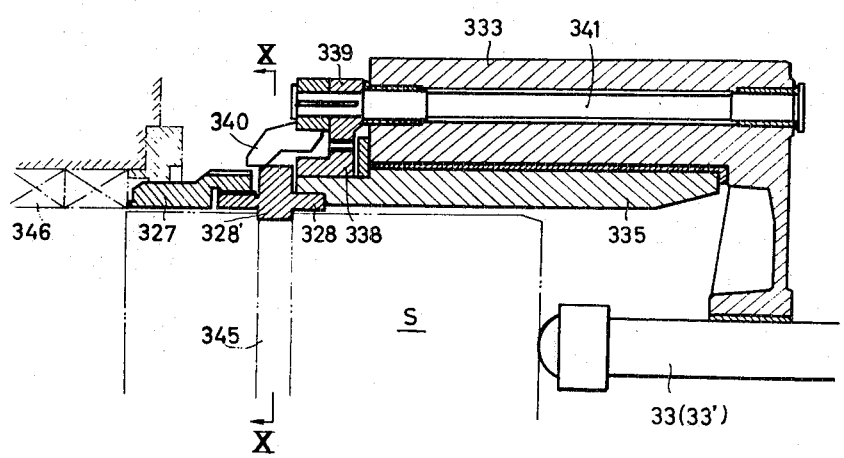
Figure 30:
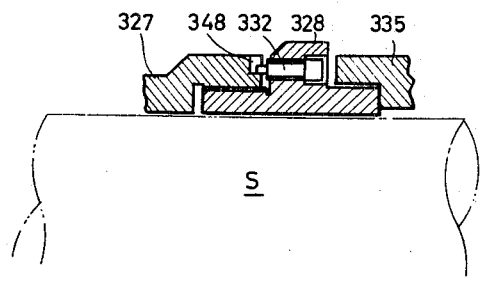

In FIGS. 26 and 30, 327 is the adjusting ring, which has, on one part of its internal surface, a female thread, in which the set collar 328 is screwed. By turning the adjusting ring 327, the roll shaft S is moved forwards and backwards along the thread in order to adjust the clearance with the inner race of the roller bearing.

In FIG. 27, the set collar 328 has on its internal surface the 4 claws 328′ to be engaged with the rolls, which claws prevent the rolls from falling out, by being engaged in the roll grooves 345 on the surface of the roll shafts S.

Adjusting ring 327 is threaded onto the male thread provided on the roll shaft S, and the roll shaft is formed with a circumferentially extending groove 349.

Figure 29:
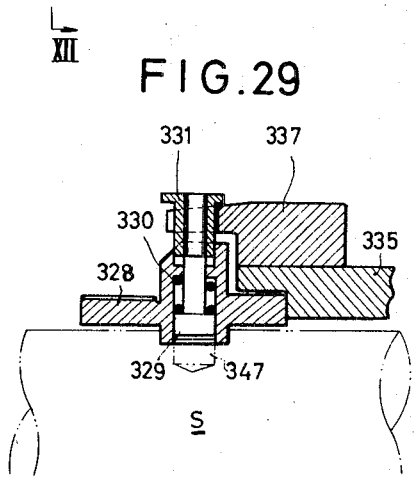

In FIG. 29, 329 is the set bolt. The set bolt 329 is mounted on any of the claws 328 of the set collar. On the other hand, at the bottom of the roll groove 345 of the roll shaft S, a hole for receiving a knock pin 347 is provided, in which hole the set bolt 329 is inserted in order to prevent the set collar 328 from turning.

330 is a spring which biases the set bolt 329 toward the surface of the roll shaft S. 331 is a nonrotatable nut which is screwed on the set bolt 329 and is provided to facilitate the set bolt 329 to be screwed into and out of the hole 347 for receiving the knock pin 347.

Referring to FIG. 30, a pin 332 is threaded through a bore or the like in set collar 328 and has a tip engageable in a notch 348 on a side face of adjusting ring 327 to serve as a stop against relative rotation.

Figure 24:
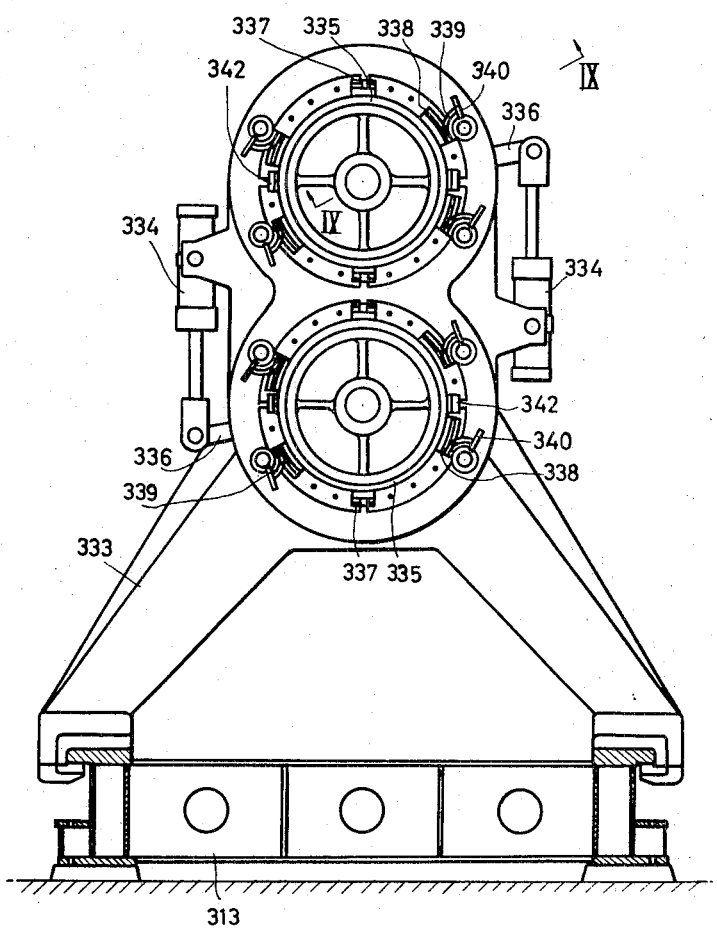
Figure 25:
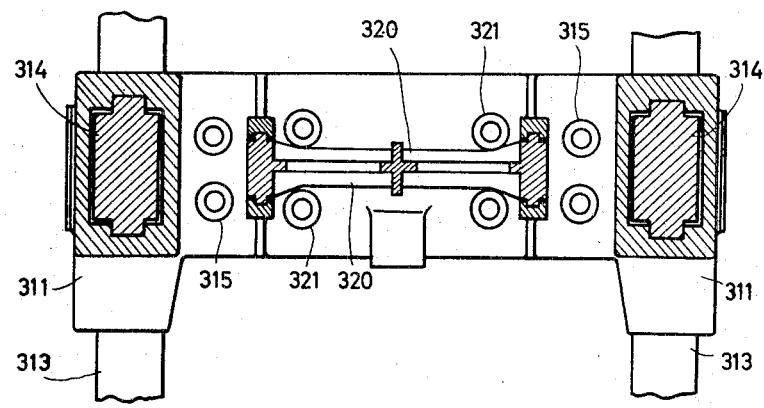

Referring to FIG. 24, set collar mounting and dismounting blocks 333 support hydraulic cylinders 334 which turn the set collar. Rings 335 are rotatably mounted on blocks 333. Levers 336 connect the hudraulic actuators 334 with rings 335.

Pin extracting claws 337 are secured with bolts to rings 335, and curved racks 338 are bolted to these rings and mesh with sector gears 339. Collar gripping claws 340 are fixed to gears 339 and shafts 341, shown more clearly in FIG. 26 are secured to the sector gears.

In FIG. 26, the shaft 341 is supported in the body of the set collar mounting and dismounting block 333 in such a manner that it may turn. 342 is the set collar claw. the set collar claws 342 are fixed with the bolts in the rings 335, are fitted into grooves 349 at two positions on the outer circumference of the set collars 328, and are intended to turn the set collars 328.

In FIG. 18, 343 are the hydraulic cylinder which move the set collar mounting and, dismounting blocks 333, and 344 the support blocks which support the hydraulic cylinders 33, 33′, 312 and 343.

The set collar mounting and dismounting mechanisms consist of the hydraulic cylinders 334 for turning the set collars, the rings 335, the levers 336, the pin extracting claws 337, the racks 338, the sector gears 339, the set collar gripping claws 340, the shafts 341, and the set collar claws 342.

The operation of the above mentioned equipment will now be explained.

(I) How to remove the chocks from the work roll chocks

The roll chocks K which have been removed as a unit, including both the upper and lower chocks, from the roll stand of a rolling mill are carried by the overhead crane to the equipment embodying the present invention, and the rolls R are laid on the tapered surfaces of the taper rolls 31 of the roll receiving block, (FIG. 20) whereby the forward and backward deviations of the rolls R are automatically corrected so that the center lines of the rolls R are brought in line with the lengthwise center line of this equipment.

In case the rolls R are carried by the overhead crane on the equipment according to the present invention, the rolls R are at times deviated due to the swing of load forward and backward with regard to the lengthwise center line of the equipment. One of the biggest reasons therefore lies in the construction that allows the falling block of the crane to turn freely.

If the rolls are lowered slowly in a swinging state, the lower side surfaces of the upper chock $T_1$ strikes against the guide roller 319. When the rolls are further lowered, the upper chocks $T_1$ are guided along the guide rollers 319 into the chock extracting block 311, and laid on the roll receiving blocks 32 in such a manner that their center line is brought in line with the lengthwise center line of the equipment.

The piston rods in the hydraulic cylinders 33 and 33′, which determine the position of the rolls, are then simultaneously projected at both lengthwise ends of the rolls R, and the rolls R are pushed with either the left or right hydraulic cylinder 33 so that they are maintained at a determined position.

In FIG. 22. and FIG. 19, when the rolls R are placed in a determined position on the taper rollers 31 with the above mentioned operation, the oil pressure in the roll receiving block 32 is removed while the roll receiving block 32 is lowered. Then, the lower surfaces of upper and lower chocks $T_1$ and $T_2$ contact, respectively, the upper surfaces of the upper chock receiving block 314 and the lower chock receiving block 320, of the right and left chock extracting blocks 311 placed in advance in advance at the determined position, so that the roll chocks K are supported.

The roll support columns 35 are connected with the hydraulic cylinder 38, which, when operated, slide both roll support columns 35—35 simultaneously on the column sliding block 39 in such a manner that the columns 35—35 move toward the rolls R separately in opposite directions. The lower roll $R_2$ is held by the roll support rollers 34, and maintained at a determined height, while the upper roll $R_1$ is, at the same time, held with the roll support rollers 34′. Thus, the chocks T are placed completely at the determined position with regard to three dimensions.

With regards to the centering between the roll support columns 35—35, the movements of both roll support columns 35—35 are symmetrically quite identical due to the intermeshing of pinion 36 and the racks 37 and 37′.

Pressure oil then is supplied to the chock fixing hydraulic cylinders 317 mounted on the chock extracting blocks 311, so that the taper pins 318 are inserted into the holes on both sides of the upper chocks. The purpose is to prevent the chocks T from being inclined and rubbed due to the resistance appearing when the chocks T are extracted from the rolls R, and further to prevent the chocks from being inclined due to unbalance of their center of gravity while the chocks T remain extracted from rolls.

In FIG. 23, by operating the hydraulic cylinder 323 for determining the position of the roll grooves, the roll groove matching push bars 322 are then advanced from the right and left, and the ends of the roll groove matching push bars 322 engage, on both sides, the flats formed as parts of the rolls R, on which the roll couplings are placed, so that both the upper and lower rolls $R_1$—$R_2$ are vertically corrected, as to proper angular position, no matter in which direction the flattened parts of the rolls are inclined.

When the flattened parts of both the upper and lower rolls $R_1$, $R_2$ have been vertically corrected, pressure oil is supplied to the hydraulic cylinders 326, 326' provided at the centers of the roll support columns 35—35 so as to operate the roll clamps 325, with which the upper and lower rolls $R_1$ $R_2$ are clamped, the rolls being engaged at diametrically opposite areas on their outer circumference, in order to maintain the vertically corrected state FIG. 21. The above having being completed, the groove matching push bars 322 are retracted by the hydraulic cylinders 323.

When the hydraulic cylinders 343 in FIG. 18 supplied with pressure oil, the set collar mounting and dismounting blocks 333 advance, guided on the sliding blocks 313 toward the center along the axial directions of the rolls until they reach the determined position.

Toward the end of this advance, the pin extracting claws 333, as shown in FIG. 29, engage beneath the heads of set bolts 329 mounted on the set collar for preventing its turning and of the nut 331. The nuts 331 pull the set bolts 329 out of the holes 347 for receiving the knock pins due to the tapered surface of the pin extracting claw 337, against the force of the spring 330, making the set collar 328 rotatable. Further, the set collar claws 342 are also fitted into the grooves 349 provided on the outer circumference of the set collar, becoming also rotatable.

When the hydraulic cylinders 334 of FIG. 24, turning the set collars are operated, the ring 335 turns by about 20° by means of the levers 336. At the top of the ring 335, as viewed in FIG. 24, two pin extracting claws 337, two set collar claws 342 and four racks 338 are mounted, making a circle.

The racks 338 mesh with sector gears 339, each of which has fixed thereto a set collar gripping claw 340. Therefore, when the ring 335 turns, the set collars 328 turn with the set collar claws 343 and the roll fitting claws 328', provided on the internal surfaces of the set collars 328, are brough in line with the roll grooves 345 of the roll shafts S, so that the set collars become ready to be pulled out smoothly. On the other hand, by turning the sector gears 339, all of the set collar gripping claws 340 turn by 90° toward the center, and grip the set collar 328 on the outer circumference.

When the hydraulic actuators 343 of FIG. 18 are operated, the set collar mounting and dismounting blocks 333 are retracted through the full stroke along the axial direction of the roll shaft, and the set collars 328 completely disengage rolls $R_1$, $R_2$ along the roll grooves 345 of the roll shaft S.

By operating the hydraulic cylinders 312 the chock extracting blocks 311 are retracted along the axial direction of the roll shafts S, so that the chocks $T_1$, $T_2$ are pulled out from the rolls $R_1$, $R_2$. The piston rods in the hydraulic cylinders 33, 33', for determining the lengthwise position of the rolls $R_1$, $R_2$, are retracted from the axial ends of the roll shafts S.

Further, in FIG. 21, by supplying pressure oil to the hydraulic cylinders 326, 326' for the roll clamps, the clamps 325 are retracted from the outer circumference of the roll shaft S.

Only the upper roll $R_1$ is suspended, and carried by the overhead crane to the roll grinding factory.

Then, by supplying pressure oil to the hydraulic cylinders 38, the roll support columns 35—35 are retracted from the roll $R_2$. When both columns 35—35 are retracted the lower roll $R_2$ is lowered slowly, due to its weight, from roll support roller 34, until it is laid upon the taper roller 31 at the head of the roll receiving block 32. After that, the lower roll $R_2$ is suspended, and carried by the overhead crane to the roll grinding factory.

II. How to mount the chocks on the work rolls

The lower roll $R_2$ which has been refinished is carried by the overhead crane, and laid upon the taper rollers 31. The piston rods in the hydraulic cylinders 33' for determining the position of the rolls are projected so that the lengthwise direction of the lower roll $R_2$ is determined. The roll support columns 35—35 are advanced toward the lower roll $R_2$ in order to support the lower roll $R_2$.

Then upper roll $R_1$ which has been refinished is carried by the overhead crane, and lowered slowly upon the roll support rollers 34' provided on the roll support columns 35—35.

The piston in the hydraulic cylinders 33 for determining the position of the rolls are projected in order to determine the lengthwise position of the upper roll $R_1$.

The chock extracting blocks 311 are moved toward each other along the axial direction of the roll shaft S in order to insert the chocks on the roll neck S.

Then by operating the hydraulic cylinders 323 for determining the position of the roll grooves and pushing forward the groove matching push bars, the roll groove matching is carried out at the ends of the roll.

By operating the hydraulic cylinders 326, 326' the roll clamps 325 are pushed out in order to clamp the rolls.

The groove matching push bars 322 are retracted, as are also taper pins 318 for fixing the upper chock $T_1$.

By supplying pressure oil to the hydraulic cylinders 343, the set collar mounting and dismounting blocks 333 are moved toward each other along the axial direction of the roll shaft S, in order to fit the set collars 328 on the roll neck S.

By operating the hydraulic cylinder 334 for turning the set collars, the set collars 328 are turned by about 20°.

The set collar mounting and dismounting block 333 are retracted toward the ends along the axial direction of the roll neck S. In this case, the pin extracting claws 339 are withdrawn from beneath the nuts 331 so that the set bolts 329 are engaged in the knock pin holes 347 of the roll neck S by means of the springs 330, preventing the roll shafts S from turning.

The piston rods in the hydraulic cylinders 33, 33' for determining the position of the rolls are retracted along the axial direction of the roll shaft S. By operating the hydraulic cylinders 326, 326', the roll clamps 323 are retracted.

By operating the hydraulic cylinders 38, the roll support columns 35—35 are retracted.

The rolls R assembled with the chocks T are as a whole suspended, and carried by the overhead crane to the provisionary warehouse.

From the foregoing description, it will be apparent that the present invention, in contrast to the conventional operation in which the upper and lower work rolls are placed on separate blocks to be handled either simultaneously or successively, both of which operations require considerable manpower and time, the manpower and time are considerably economized, the overall efficiency of use of the crane is considerably improved, highly skilled personnel are not needed, the general atmosphere of the operation is improved, and additional advantages are obtained.

We claim:

1. Apparatus for removing and replacing chocks mounting working rolls of a rolling mill, said apparatus comprising, in combination, a pair of working roll support columns mounted for movement toward and away from each other, each column having, on its surface facing the other column, supporting rollers for working rolls; working roll receiving blocks between said columns and having working roll support surface means constructed to center horizontally a working roll positioned between said columns; a pair of mounting blocks mounted for movement parallel to the axis of a working roll supported between said columns, each mounting block being cooperable with a respective opposite end of the working roll; and respective mechanisms carried by said mounting blocks and each engageable with the chock retaining means on a respective end of the working roll to mount and dismount the respective retaining means relative to the working roll.

2. Apparatus for removing and replacing chocks mounting working rolls of a rolling mill, as claimed in claim 1, including a pair of chock supports, one positioned on either side of said pair of working roll support columns; each of said chock supports being movable axially of a working roll supported between said columns to engage and support the chocks on respective opposite ends of the working roll.

3. Apparatus for removing and replacing chocks mounting working rolls of a rolling mill, as claimed in claim 1, in which the chock retaining means comprise nuts threaded on end portions of a working roll, the peripheries of said nuts being formed as external ring gears; each of said mechanisms including a pinion engageable with a respective external ring gear upon movement of the associated mounting block toward an end of a working roll; and power means for rotating each pinion to unscrew a nut from a working roll and screw a nut onto a working roll.

4. A method of removing and replacing chocks, mounting working rolls of a rolling mill, comprising the steps of positioning a working roll, assembled with its mounting chocks, on working roll centering surfaces of a pair of working roll receiving blocks; embracing the working roll by supporting rollers on facing surfaces of a pair of columns movable toward the working rolls supported on the blocks; lowering the blocks so that the working roll is supported by the supporting rollers; supporting the chocks independently of the working roll; and withdrawing the mounting chocks axially outwardly from the ends of the working roll.

5. A method of removing and replacing chocks, mounting working rolls of a rolling mill, as claimed in claim 4, comprising the step of, in advance of removing the chock retaining means, angularly displacing the working roll, supported in the supporting rollers, to a predetermined angular orientation.

6. Apparatus for removing and replacing chocks mounting working rolls of a rolling mill, as claimed in claim 1, in which the retaining means comprise nuts threaded on end portions of a working roll; each of said mechanisms comprising a substantially cylindrical drum support; a substantially cylindrical drum rotatably mounted in said drum support; a ring gear rotatably mounted on said drum; said ring gear having angularly spaced spiral slots in a face thereof; nut gripping claws mounted in said spiral slots for movement therealong upon rotation of said ring gear; driving means operable to rotate said ring gear, when the associated mounting block is positioned adjacent and end of a working roll positioned between said columns, in a direction to move said claws radially inwardly to grip the nut; and driving means operable to rotate said drum in said drum support, with said ring gear remaining stationary relative to said drum, to unscrew a nut from a working roll and to screw a nut onto the working roll.

7. Apparatus for removing and replacing chocks mounting working rolls of a rolling mill, as claimed in claim 1, in which the ends of each working roll are formed with a pair or diametrically opposite flattened chordal surfaces joined by circular arcuate surfaces, each circular arcuate surface having a circumferential groove therein; the chock retaining means comprising set collars having radially inwardly projecting fingers engaged in the grooves when the set collars have a predetermined relative angular orientation; said apparatus comprising means engaged with said flat chordal portions of a working roll positioned between said columns to rotate the working roll to a predetermined angular orientation; each of said mechanisms comprising a rotatable member interlockable with a respective set collar when the collar has the predetermined angular orientation; driving means operable to rotate said rotatable members to rotate the associated set collar to an angular position in which the radially inwardly projecting fingers thereon are disengaged from the shaft grooves; each of said mechanisms further including means engageable behind the respective set collar to draw the respective set collar off the working roll responsive to movement of said mounting blocks away from each other in a direction parallel to the axis of the working roll.

8. Apparatus for removing and replacing chocks mounting working rolls of a rolling mill, as claimed in claim 1, in which said working rolls support surface means comprises a V-shape support surface.

9. Apparatus for removing and replacing chocks mounting working rolls of a rolling mill, as claimed in claim 1, in which said working rolls support surface means comprises tapered rollers.

References Cited

UNITED STATES PATENTS 2,363,378   11/1944   Young _____ 72—238

CHARLES W. LANHAM, Primary Examiner

B. J. MUSTAIKIS, Assistant Examiner